(12) United States Patent
Testerman et al.

(10) Patent No.: US 10,489,600 B2
(45) Date of Patent: Nov. 26, 2019

(54) ACCESS PATH REDIRECTION FOR ENCRYPTED FILES

(71) Applicant: Dell Products L.P., Round Rock, TX (US)

(72) Inventors: James D. Testerman, McKinney, TX (US); David J. Fitzgerald, Rowlett, TX (US); Oliver C. Ryan, Austin, TX (US); Vadamalar Varadarajan, Frisco, TX (US); Adam W. Meek, Colleyville, TX (US); Venkata S N M Prayaga, Piscataway, NJ (US); Nitin D. Dixit, Coppell, TX (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 15/581,192

(22) Filed: Apr. 28, 2017

(65) Prior Publication Data

US 2018/0314838 A1 Nov. 1, 2018

(51) Int. Cl.
*G06F 21/60* (2013.01)
*G06F 16/14* (2019.01)
*G06F 16/16* (2019.01)
*G06F 16/188* (2019.01)

(52) U.S. Cl.
CPC .......... *G06F 21/602* (2013.01); *G06F 16/148* (2019.01); *G06F 16/162* (2019.01); *G06F 16/188* (2019.01); *G06F 2221/2107* (2013.01)

(58) Field of Classification Search
CPC ............. G06F 21/602; G06F 17/30106; G06F 17/30233; G06F 17/30238; G06F 17/30235; G06F 17/30117; G06F 16/188; G06F 16/162; G06F 16/148; G06F 2221/2107

See application file for complete search history.

(56) References Cited

U.S. PATENT DOCUMENTS

| | | | |
|---|---|---|---|
| 9,110,963 B2 | 8/2015 | Burchett et al. | |
| 2002/0099947 A1* | 7/2002 | Evans | G06F 21/6209 713/193 |
| 2008/0165957 A1* | 7/2008 | Kandasamy | G06F 21/6218 380/44 |
| 2013/0219176 A1* | 8/2013 | Akella | H04L 63/0815 713/165 |
| 2013/0246806 A1* | 9/2013 | Usuba | G06F 21/6209 713/189 |

(Continued)

*Primary Examiner* — Huan V Doan
(74) *Attorney, Agent, or Firm* — Norton Rose Fulbright US LLP (57) ABSTRACT

Many users of information handling systems use applications to create, manage, and/or save files containing information. Encryption of the files secures the data against access by unintended recipients. Information handling systems may be designed to perform encryption in the background with minimal user input. For example, applications, application plug-ins, or operating system (OS) level system services may facilitate encryption and decryption of application files with minimal user input. Such applications, plugins, and services may allow applications to interact with encryption systems, such as virtual file systems, and may direct file save and access operations through the encryption systems, automatically encrypting and decrypting files selected by the user without exposing the user to cumbersome or confusing encryption options.

17 Claims, 5 Drawing Sheets

(56) References Cited

U.S. PATENT DOCUMENTS

| | | | |
|---|---|---|---|
| 2013/0268545 A1* | 10/2013 | Burchett | G06F 16/258 |
| | | | 707/754 |
| 2014/0013112 A1* | 1/2014 | Cidon | G06F 21/6218 |
| | | | 713/165 |
| 2018/0295105 A1* | 10/2018 | Feng | H04W 4/80 |

* cited by examiner

FIG. 5

ACCESS PATH REDIRECTION FOR ENCRYPTED FILES

FIELD OF THE DISCLOSURE

The instant disclosure relates to file management on information handling systems. More specifically, portions of this disclosure relate to encryption of files on information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Along with the increasing value and use of information, the importance of security of information processed, compiled, stored, and/or communicated by information handling systems has increased. Information handling systems may be configured to encrypt files containing information before storing and/or transmitting them in order to enhance information security. Many information handling system encryption systems require user input in determining how and when to encrypt files and where to store them. Such options may be confusing or cumbersome to a user. For example, an information handling system may require a user to encrypt a file after saving the file or to manually engage a decryption process prior to opening a file. Requiring user input may cause the user to abandon using encryption, thus leaving the information contained in the files less secure.

Shortcomings mentioned here are only representative and are included simply to highlight that a need exists for improved information handling systems, such as data centers and personal computing devices. Embodiments described herein address certain shortcomings but not necessarily each and every one described here or known in the art. Furthermore, embodiments described herein may present other benefits than, and be used in other applications than, those of the shortcomings described above.

SUMMARY

Many users of information handling systems use applications to create, manage, and/or save files containing information. Encryption of the files secures the data against access by unintended recipients. Information handling systems may be designed to perform encryption in the background with minimal user input. For example, applications, application plug-ins, or operating system (OS) level system services may facilitate encryption and decryption of application files with minimal user input. Such applications, plugins, and services may allow applications to interact with encryption systems, such as virtual file systems, and may direct file save and access operations through the encryption systems, automatically encrypting and decrypting files selected by the user without exposing the user to cumbersome or confusing encryption options.

Redirecting files through encryption systems with minimal user input may, however, introduce apparent inconsistencies in file access path descriptions. Such inconsistencies may be confusing to a user. Operating systems and applications often maintain lists of recently-used files that may display access paths for accessing the files. When file save and access operations are automatically redirected through encryption systems, the entries in the lists of recently-used files may display access paths indicating that the file was redirected through the encryption system rather than the access path that a user would expect given where the user directed the file to be saved. Such listings may be confusing to a user. For example, instead of listing a file with an access path indicating a "Documents" folder on a standard computer drive, such as a C drive, where a user had instructed the file to be saved, the file may be listed as having an access path associated with the encryption system, which may contain cryptic character strings containing seemingly random letters, numbers, and symbols. Therefore, an application or OS-level service may be configured to search application listings and/or system registries of recently-used files for entries indicating usage of an encryption system and delete those entries from the registries and listings. In some instances, the application or service may be configured to replace the entries indicating usage of the encryption system with entries indicating the location where the user directed the file to be stored.

An application may be used to access files in an encrypted system, such as a virtual file system. A virtual file system may be an OS-level service for managing file creation, encryption, and access. An application plug-in may be used to facilitate interaction between the application and the virtual file system, or the application may be configured to interact directly with the virtual file system. When a user selects a file to be opened, it may be accessed, by the application, through a first access path. The first access path may be an access path to the file through a default file system of the information handling system. For example, a user may navigate to a "Documents" folder and select a file to be opened from that folder or a sub-folder. The application or application plug-in may examine the selected file to determine whether any portion of the file is encrypted. The determination may be made by examining a cover page or file wrapper of the file to determine if an encryption indicator is contained therein. Such an indicator may, in some cases, be stored in metadata of the cover page or file wrapper of the file. If the file is not encrypted through the virtual file system, the application may proceed to display the file to the user. However, if the file is encrypted, the application may access the file through a second access path, through a decryption algorithm of the virtual file system. The decryption algorithm may be implemented in a transformer module, such as described in U.S. Pat. No. 9,110,963 to Burchett et al. and entitled "TRANSPARENT ADAPTIVE FILE TRANSFORM," which is hereby incorporated by reference. In some embodiments, the application plug-in may direct the application to access the file through the second access path. When the file is accessed through the second access path, the decryption algorithm of the virtual file system may decrypt the file before the file is processed by the application and displayed to the user.

An OS-level service may be used to detect and redirect file access requests for encrypted files. The OS-level service may detect a file access request from an application for a file through a first access path. The service may then determine whether the file is encrypted. The determination may be made by searching a list of encrypted files to determine whether a parameter indicating the file, such as name of the file or access path of the file, is located in the list, or examining the file type to determine whether the file is a type of file indicating encryption. If the file is not encrypted, the service may allow the application to open the file and display the file to the user. However, if the file is encrypted, the service may transmit a second access path to the application for accessing the file through a decryption algorithm of the virtual file system. When the application receives the second access path, the application may open the file through the second access path, the virtual file system may decrypt the file, and the file may be opened and displayed to the user. Any of the operations described for an application may instead be performed by a plug-in of the application.

When a save request is detected for saving a file to a first file save path, the application or application plug-in may determine whether the save request contains an encryption request. If not, the application may save the file, unencrypted to the file save path. If the file save request contains an encryption request, the file may be encrypted, through an encryption algorithm of the virtual file system, and saved, by the application, to a second file save path. Alternatively, the application may save all files to the second file save path. If all files are saved to the second file save path, there may be no need to determine whether an encryption request is contained in the file save request. The second file save path may be through an encryption algorithm of the virtual file system.

Information handling systems and applications executed on information handling systems may maintain records of recently-used files to enable users to easily find and access such files. File access records may be contained in registries or application listings of most recently updated or accessed files. Registries and application listings may also contain and display access paths associated with the recently-used files. When file save paths or access paths are redirected through an encryption or decryption algorithm of the virtual file system, system registries or application listings may be updated to reflect those paths. Because much of the interaction between the application or plug-in and the virtual file system is performed automatically without input from a user, the user may be confused if a file access path different from a file access path they used when saving or opening the file is displayed. Therefore, an OS-level service may search system registries containing lists of recently-used files for recent file access indicators that indicate access paths associated with the virtual file system. The service may then delete those indicators and may, if desired, replace those indicators with indicators that indicate access paths that would be recognized by a user such access paths through a default file system of the information handling system. An application or application plug-in may search application listings of recently-used files for indicators that indicate access paths associated with the virtual file system. When such indicators are detected, the application or plug-in may delete them, and may replace them with indicators indicating access paths that would be recognized by a user, such as access paths through a default file system of the information handling system. Aspects of these embodiments may involve cooperation between user-mode software, such as an application, and kernel-mode software, such as the OS-level service.

A computer program product may contain code to perform steps for accessing, encrypting, and/or decrypting files and/or processing registry or other indicators similar to those described herein. The code may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling systems may execute software for management of the information handled. Information may be generated and manipulated by applications executed on information handling systems and may be stored in data structures, such as files. Operating system (OS)-level file management systems may be used to manage, organize, and protect files. Protection of files may include encrypting and decrypting files stored on the system. Encryption and decryption mechanisms may operate automatically in the background to reduce the complexity for the user. One such method of managing encryption and decryption of files in the background is a virtual file system.

Figure 1:
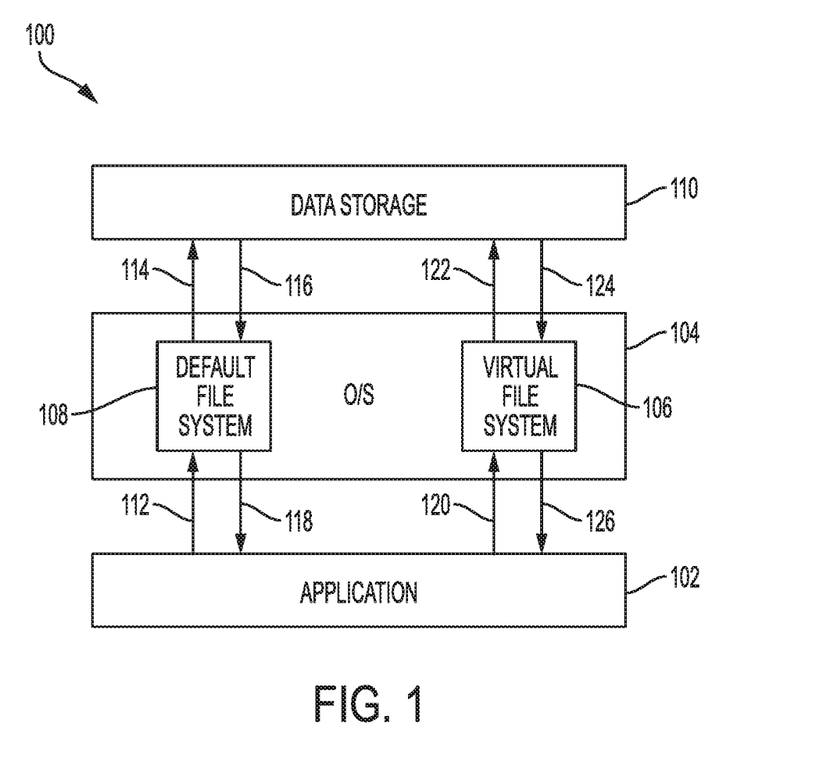
FIG. 1 is a block diagram illustrating a system for encrypting and decrypting files through a virtual file system of an information handling system according to some embodiments of the disclosure.

The virtual file system may contain encryption and decryption algorithms to encrypt files either automatically or when a user requests encryption and decrypt files when a user accesses them. The encryption and decryption algorithms may function to encrypt and decrypt portions of files or files in their entirety. A system 100 for managing file activity from an application 102 through implementation of a virtual file system 106 is shown in FIG. 1. An application 102, such as a word processor, a spreadsheet application, a presentation application, an image editing application, or other application that may create and/or access files on an information handling system, may request access 112 to a file from a default file system 108 of the operating system 104. The default file system 108 may be a standard file system built into the operating system 104 that a user may interact with directly. The default file system may request 114 the file from a data storage 110, retrieve 116 the file from the data storage 110, and return 118 the file to the application 102. The data storage 110 may be a solid state drive, a hard drive, or other data storage device and may be local or may be remotely-accessed cloud storage. When accessing an encrypted file, through the virtual file system 106, the application 102 may request 120 a file from the virtual file system 106. An encrypted file may be a file that is at least partially encrypted. The virtual file system 106 may encrypt and decrypt files passing through it, to prevent access by unintended users. The virtual file system 106 may then request 122 the file from the data storage 110 and the data storage may return 124 the file to the virtual file system. The virtual file system 106 may decrypt the file and return 126 the decrypted file to the application 102. Separate access paths 112-118 and 120-126 for accessing the same encrypted file in the data storage 110 through the default file system 108 and the virtual file system 106, respectively, may exist. A file access path may include a combination of virtual and/or physical busses through which data stored at a particular location in data storage may be accessed. A particular access path for accessing particular data may be activated by a corresponding address mapped to the particular access path. If an encrypted file is accessed through the default file system 108, the application 102 may be unable to read some or all of the contents of the file as the contents will not be decrypted, while if the encrypted file is accessed through the virtual file system 106 the file may be decrypted by the virtual file system 106 and readable in its entirety by the application 102. Similarly, the virtual file system 106 may encrypt files being passed through the virtual file system before they are stored in data storage 110.

Figure 2:
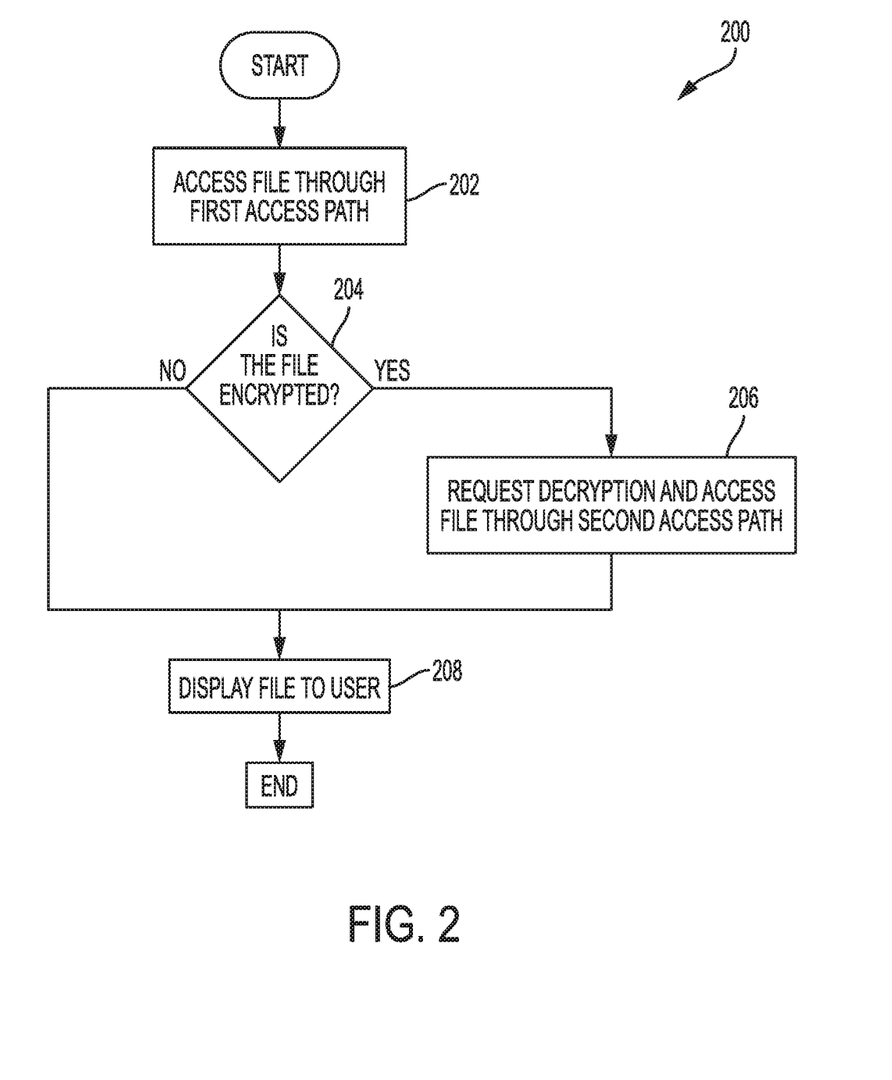
FIG. 2 is a flow chart illustrating an example method for decrypting and accessing a file according to some embodiments of the disclosure.

An application may interact with the default file system and virtual file system, analyzing files accessed to determine if they are encrypted and require decryption through the virtual file system. Alternatively, an application plug-in may be used to facilitate interaction between the application and the virtual file system and to determine whether access filed require decryption. FIG. 2 shows an example method for accessing and decrypting encrypted files through a virtual file system. The method may begin at block 202 when a file is accessed by the application through a first file access path. The first access path may access the file through the default file system. An example of a first access path may be access path 112-118 described with reference to FIG. 1. After the file is accessed by the application through the first access path, a determination may be made, at step 204, of whether the file is encrypted. Such a determination may be made by an application plug-in or may be made by the application itself by searching a file wrapper or cover page of the file for an encryption indicator. The encryption indicator may be located, for example, in metadata of a file wrapper or cover page. The file wrapper or cover page may also contain the encrypted contents of the file. If the file is not encrypted, the application may display the opened file to the user at step 208. If an encryption indicator is detected, the file may be closed by the application or the application plug-in. The plug-in may then direct the application to open the file through a second file access path through a decryption algorithm of a virtual file system. The application may access the file through the second file access path, at step 206, for example, access path 120-126 described with reference to FIG. 1. In some embodiments, the application may be configured to open the file through the second file access path without direction of an application plug-in. The virtual file system decryption algorithm may decrypt the file as it is retrieved and pass the decrypted file to the application, at step 206. Encrypted content contained in a file wrapper or cover page may be extracted by the virtual file system, and the encrypted content may then be decrypted by a decryption algorithm of the virtual file system. The decrypted file may then be accessed by the application and displayed to the user, at step 208. For example, a user may navigate to a documents folder on an information handling system and select a file to be accessed. An application may open the file, and an application plug-in may detect an encryption indicator. The plug-in may direct the application to close the file before it is displayed to the user and may direct the application to access the file through a second access path that passes through the virtual file system. The virtual file system may decrypt the file as it is retrieved from a data storage by the application, and the application may process the contents of the decrypted file and display the contents to the user.

Figure 3:
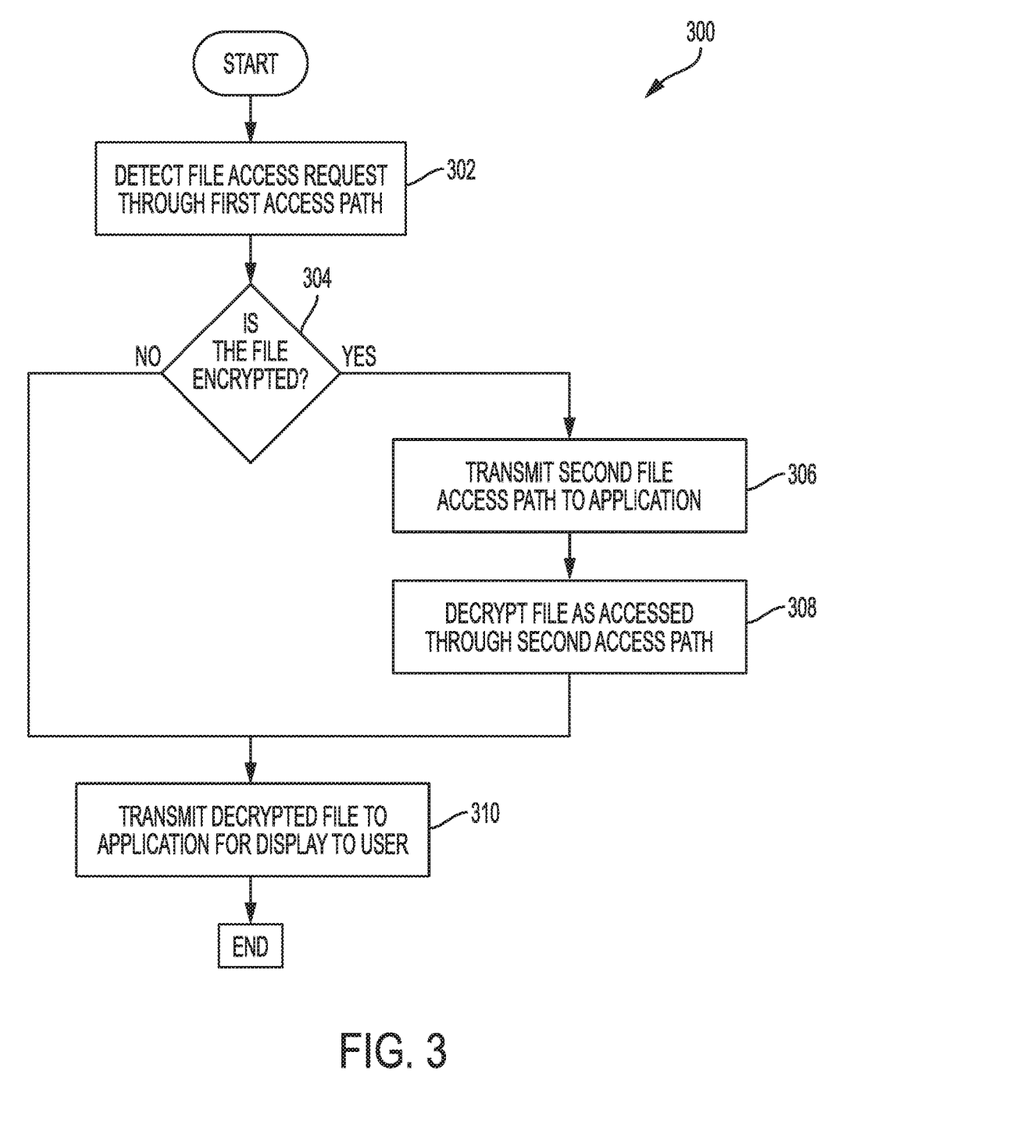
FIG. 3 is a flow chart illustrating an example method for decrypting and accessing a file according to some embodiments of the disclosure.

An OS-level service may facilitate interaction between an application and a virtual file system. FIG. 3 shows an example method for accessing and decrypting files through the virtual file system. The method 300 may begin at step 302 with detection of a file access request for accessing the file through a first access path. The file access request may be generated by an application or the file system and may be detected and intercepted by the OS-level service before the file is retrieved by the application. Alternatively, the file access request may be detected by an application or application plug-in and relayed to the OS-level service. Like the first access path described with respect to FIG. 2, the first access path may be through a default file system. A determination may then be made, at step 304, of whether the file requested by the file access request is encrypted. Such a determination may be made by the OS-level service by, for example, examining a list of encrypted files to see if the file is indicated by a parameter, such as a file name, location, access path, or other parameter indicating the file, in the list of encrypted files. Alternatively or additionally, the file may be examined by the OS-level service to determine if a file type of the file is an encrypted file type. For example, the file may be contained within a file wrapper or cover page, indicating that the file is encrypted, and such a file wrapper or cover page may be indicated by the file type. Such a determination may also be made by the application or application plug-in described with respect to step 204 of FIG. 2, by opening the file and searching the file for an encryption indicator. If the file is not encrypted, it may be opened by the application and displayed to the user at step 310. If the file access request for accessing the file through the first access path was intercepted by the OS-level system service, the application may be allowed to retrieve the file after it is determined that the file is not encrypted. If the file is encrypted, the OS-level system service may transmit a second file access path to the application at step 306. The second file access path may be an access path through a decryption algorithm of the virtual file system and may be transmitted directly to the application, or to an application plug-in. At step 308, the virtual file system may decrypt the file in response to another request from the application indicating the second file access path provided at step 306 as the file is accessed through the second access path by the application. The decrypted file may then be transmitted to the application for display to the user at step 208. The user experience may be the same whether the process is performed by a OS-level process or an application plug-in as encrypted files may be decrypted in the background without requiring user input in the decryption process.

Figure 4:
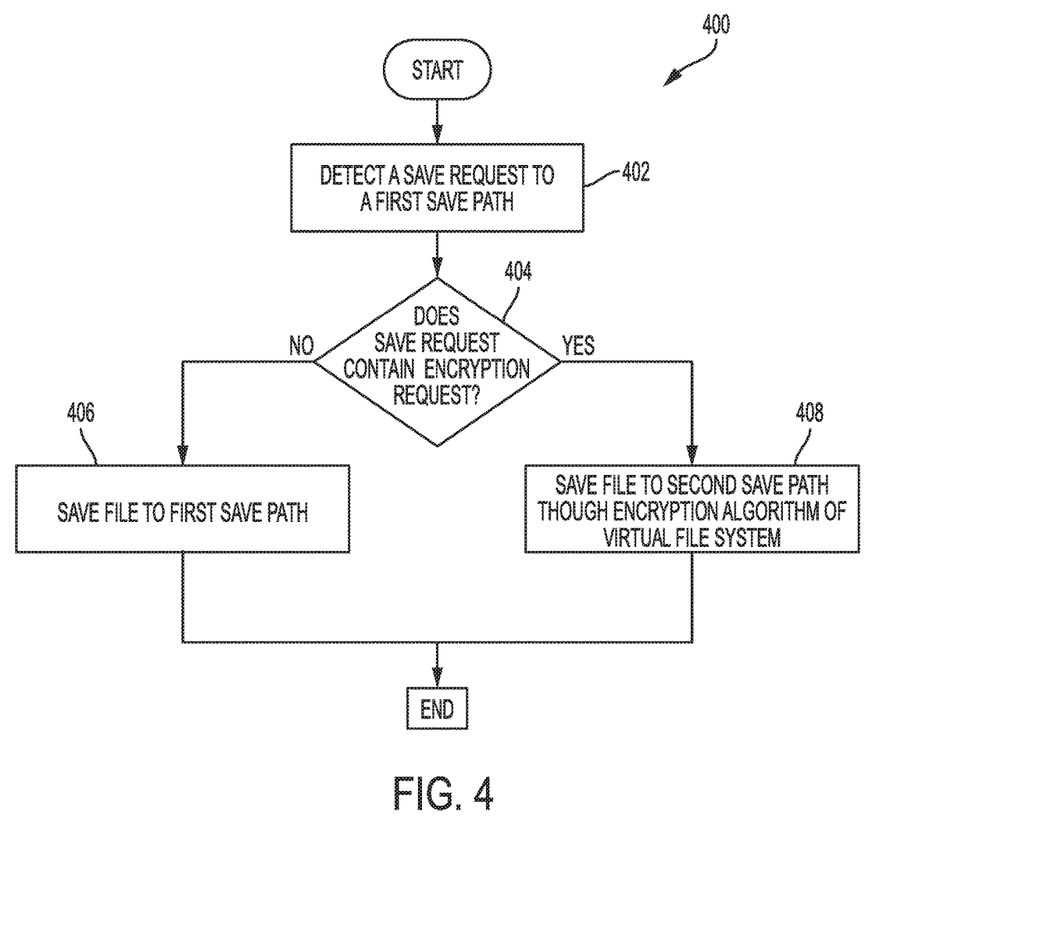
FIG. 4 is a flow chart illustrating an example method for encrypting and saving a file according to some embodiments of the disclosure.

In addition to accessing files, applications may also be used to create and save files. An example method for saving and encrypting files created by an application is illustrated in FIG. 4. The method 400 may begin at step 402 with detecting a save request for a file for saving the file to a first save path. The first file save path may be a file save path through a default file system, such as default file system 108 described with respect to FIG. 1, and may be the same as the first file save path described with reference to FIGS. 2 and 3. The save request may be detected by an application, an application plug-in, or by an OS-level service. A determination may then be made, at step 404, of whether the save request contains an encryption request. The encryption request may be included by a user selecting an option for the file to be encrypted when saved. If the save request does not contain an encryption request, the file may be saved through the first file save path at step 406. If the save request does contain an encryption request, the file may be encrypted by the virtual file system as the file is saved to a second file save path at step 408. In one embodiment, the application may request encryption of the file by the virtual file system via an explicit encryption request. The second file save path may be a save path through an encryption algorithm of a virtual file system. The first and second file save paths may each save the file to the same location in a data storage, but the first save path may save the file to the location through a default file system while the second file save path may save the file to the location through the virtual file system. Alternatively, all files saved by the application may be encrypted by default. In such cases, all files saved by the application may be encrypted by the virtual file system as they are saved to a second file save path at step 408. If all files are saved to a second file save path and encrypted by the virtual file system, there may be no need to determine whether the file save request includes an encryption request, at step 404. The determination of whether the file is encrypted and the saving of the file through the virtual file system may be performed in the background so that the user may be unaware that the file is being saved through the second access path.

Figure 5:
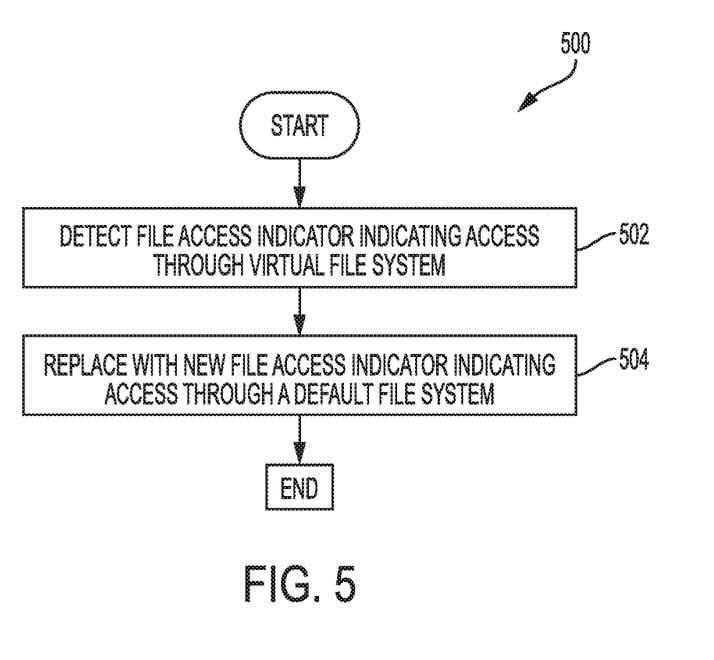
FIG. 5 is a flow chart illustrating an example method of adjusting file access indicators according to some embodiments of the disclosure.

Applications executing on information handling systems may maintain records of recently used or updated files in system registries or application lists that provide users with easy access to recently-used files. The application list may be a list of recently-used files that are accessible by the application. In some cases, such lists and registries may also be referred to as most recently updated (MRU) lists and registries. Details specifying file access paths may be recorded in the registries and lists. Displaying file access paths associated with the virtual file system, such as the second access paths of FIGS. 2 and 3 and the second save path of FIG. 4, may be confusing to a user as the user may be unaware of the operation of the virtual file system and the redirection of file access and save paths for encrypted files. A method 500 for revising file access indicators is shown in FIG. 5. The method 500 begins with detecting a file access indicator indicating access of a file through the virtual file system at step 502. Such an indicator may be a recent file access indicator indicating that the file was recently accessed through an access path through the virtual file system. The indicator may comprise a file access or save path through the virtual file system. The file access indicator may be detected by an OS-level system service searching a system registry and detecting the indicator therein. Alternatively or additionally, the file access indicator may be detected by an application or application plug-in searching an application listing of recently-used files and detecting the indicator therein. When a file access indicator indicating access of a file through the virtual file system is detected, the application, application plug-in, or OS-level system service may delete the indicator. At step 504, the service, application, or plug-in may replace the file access indicator with a new file access indicator. When replacing the indicator, the file access indicator may be replaced with the new file access indicator only if a file access indicator identical to the new file access indicator is not already present in the list. The new file access indicator may indicate an access path through another file system of the information handling system such as a default file system. The new file access indicator may comprise a file access path through a default file system. Thus, file access indicators indicating file access paths associated with the virtual file system may be replaced with file access indicators indicating file access paths associated with another file system of the information handling system, such as a default file system.

A virtual file system may also be referred to as a call-back file system, such as the system described in U.S. Pat. No. 9,110,963. A call-back file system can provide an extensible action pipeline that is applied to files dynamically as they are accessed from and saved to a data storage. For example, a call-back file system can be configured to allow an action or a combination of actions to be performed on a file in response to access of the file by an application. A data transform may be performed on a file in response to access of the file by an application and may include data compression and/or encryption. Data transforms may also include file-type transformation, rights management embedding, file name obfuscation, bulk upload, or a change of communications protocols. The call back file system may also be configured to create a backup or a shadow copy of data accessed at a second location. The call-back file system may perform content filtering (e.g., removal of credit card or other personal or private data). The call-back file system may add or remove metadata. The call-back file system may be configured to add an entry to an audit log showing file activity. Various actions of the call-back file system may be set on an application-by-application basis, in response to the type of data access activity, in response to the content of the data being accessed, or the like. The call-back file system may be configured to perform file transform and record-keeping operations in the background with little input by a user.

The schematic flow chart diagrams of FIGS. 2-5 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for accessing files on an information handling system, the method comprising:
   requesting to access, by an application, a file through a first access path;
   determining, in the application, that at least part of the file is encrypted;
   determining, in the application, a second access path;
   accessing, by the application, the file through the second access path, the second access path being through a decryption algorithm of a virtual file system;
   detecting a file access indicator indicating the second access path; and
   deleting the file access indicator.

2. The method of claim 1, wherein the step of detecting a file access indicator comprises:
   searching a system registry for the file access indicator; and
   detecting the file access indicator in the system registry.

3. The method of claim 1, wherein the step of detecting a file access indicator comprises:
   searching an application list by the application for the file access indicator; and
   detecting the file access indicator in the application list.

4. The method of claim 1, further comprising:
   replacing the file access indicator with a new file access indicator indicating the first access path.

5. The method of claim 1, further comprising:
   detecting a save request for saving the file to a first file save path;
   detecting an encryption request in the save request; and
   saving, by the application, the file to a second file save path, the second file save path being through an encryption algorithm of the virtual file system.

6. The method of claim 1, wherein the step of determining that at least part of the file is encrypted comprises:
   detecting an encryption indicator in a cover page of the file by the application.

7. A computer program product for implementation on an information handling system, comprising:
   a non-transitory computer readable medium comprising code to perform steps comprising:
   requesting to access, by an application, a file through a first access path;
   determining, in the application, that at least part of the file is encrypted;
   determining, in the application, a second access path;

accessing, by the application, the file through the second access path, the second access path being through a decryption algorithm of a virtual file system;

detecting a file access indicator indicating the second access path; and deleting the file access indicator.

8. The computer program product of claim 7, wherein the step of detecting a file access indicator comprises:

searching a system registry for the file access indicator; and detecting the file access indicator in the system registry.

9. The computer program product of claim 7, wherein the step of detecting a file access indicator comprises:

searching an application list by the application for the file access indicator; and detecting the file access indicator in the application list.

10. The computer program product of claim 7, wherein the non-transitory computer readable medium comprises code to perform steps further comprising:

replacing the file access indicator with a new file access indicator indicating the first access path.

11. The computer program product of claim 7, wherein the non-transitory computer readable medium comprises code to perform steps further comprising:

detecting a save request for saving the file to a first file save path;

detecting an encryption request in the save request; and saving the file to a second file save path, the second file save path being through an encryption algorithm of the virtual file system.

12. The method of claim 7, wherein the step of determining that at least part of the file is encrypted comprises:

detecting an encryption indicator in a cover page of the file by the application.

13. A method for accessing files on an information handling system, the method comprising:

detecting, by an OS-level service, a file access request, from an application, for accessing a file through a first access path;

determining that at least part of the file is encrypted;

transmitting, to the application, a second access path, the second access path being an access path for the file through a decryption algorithm of a virtual file system;

decrypting the file for the application when the file is accessed through the second access path;

detecting a file access indicator indicating the second access path; and deleting the file access indicator.

14. The method of claim 13, wherein the step of detecting a file access indicator comprises:

searching a system registry for the file access indicator; and detecting the file access indicator in the system registry.

15. The method of claim 13, further comprising:

replacing the file access indicator with a new file access indicator indicating the first access path.

16. The method of claim 13, further comprising:

detecting a save request, from the application, for saving the file to a first file save path;

detecting an encryption request in the save request;

transmitting, to the application, a second save path, the second save path being a save path for the file through an encryption algorithm of the virtual file system; and encrypting the file for the application when the file is saved to the second save path.

17. The method of claim 13, wherein the step of determining that at least part of the file is encrypted comprises:

searching a list of encrypted files; and detecting a parameter indicating the file in the list of encrypted files.

* * * * *